T. B. ATTERBURY.
Molds for Pressing Glass Lamp-Chimneys.
No. 168,863. Patented Oct. 19, 1875.
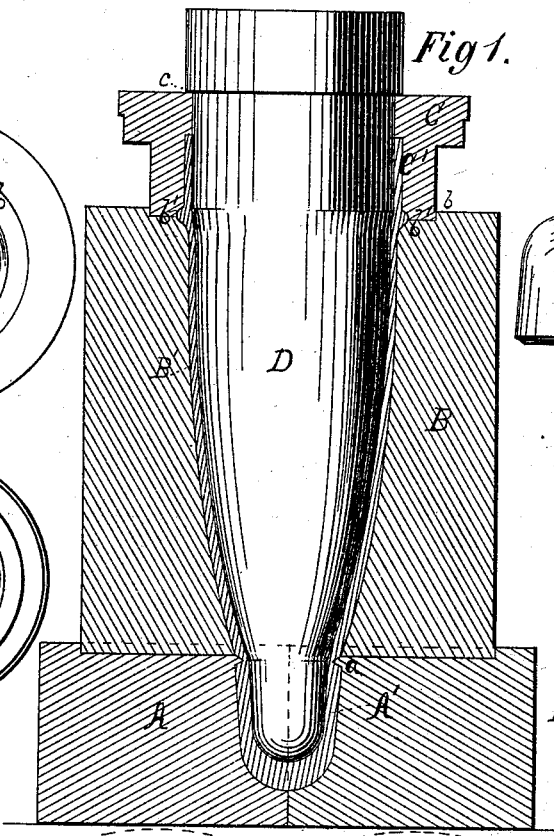
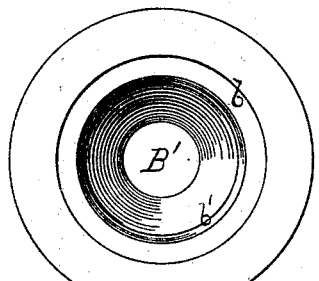
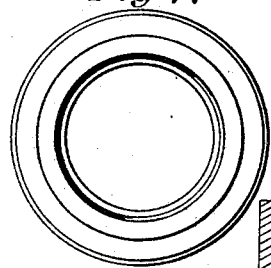
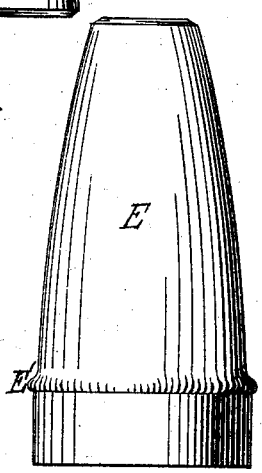
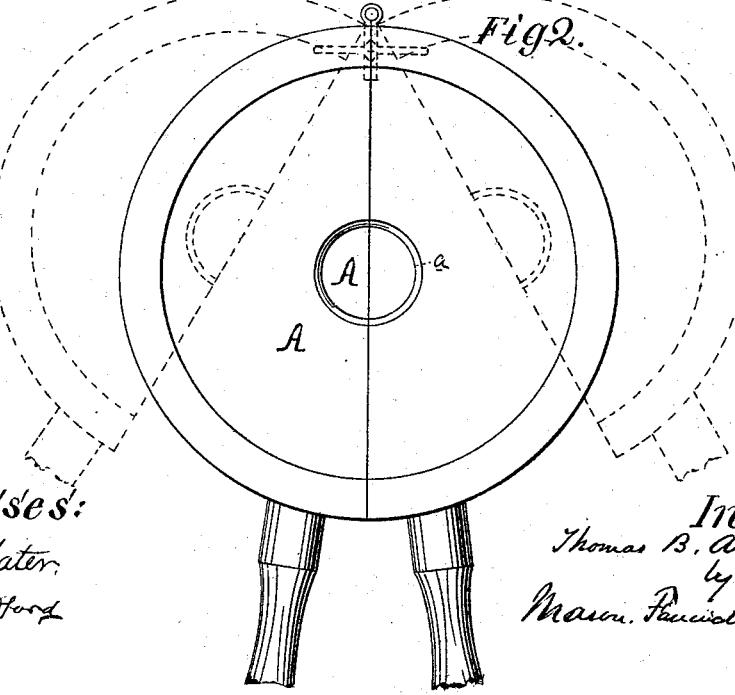
Witnesses:
Inventor:
Thomas B. Atterbury
by
Mason, Fenwick & Lawrence

UNITED STATES PATENT OFFICE.

THOMAS B. ATTERBURY, OF PITTSBURG, PENNSYLVANIA, ASSIGNOR OF ONE-HALF HIS RIGHT TO JAMES S. ATTERBURY, OF SAME PLACE.

IMPROVEMENT IN MOLDS FOR PRESSING GLASS LAMP-CHIMNEYS.

Specification forming part of Letters Patent No. 168,863, dated October 19, 1875; application filed October 6, 1875.

*To all whom it may concern:*

Be it known that I, THOMAS B. ATTERBURY, of the city of Pittsburg, county of Allegheny and State of Pennsylvania, have invented a new and useful Improvement in Molds for the Manufacture of Pressed-Glass Lamp-Chimneys, and in Lamp-Chimneys; and I do hereby declare that the following is a full, clear, and exact description thereof, reference being had to the accompanying drawings, making part of this specification, in which—

Figure 1 is a vertical section of my invention, the plunger being shown in elevation and within the mold; and Fig. 2 is a plan view of the base-section; Fig. 3, a top view of the intermediate section, and Fig. 4 a view of the reverse or under side of the upper section of the same. Fig. 5 represents a lamp-chimney formed in my improved mold, the tip separated therefrom.

My invention consists in a mold adapted to the manufacture of seamless pressed-glass lamp-chimneys, and in a seamless glass lamp-chimney, formed by pressure in a properly-constructed mold, and may be more particularly described as follows:

A, Fig. 1, is the base-section, halved vertically, and hinged together so as to open and shut horizontally, as indicated by the dotted lines in Fig. 2. B is the intermediate section, cylindrical in form, and resting in a seat in the top of the base A; and C is the top ring-section of the mold, resting upon the top of the intermediate section B, the whole being so arranged as to enable each piece to be lifted vertically from off the other whenever desired. D is the plunger. The base-section A is constructed with a slightly conical cavity, A′, of any proper dimension, only so that it is smaller in diameter than the apex of the conical hollow or passage in the section B. This cavity serves as a reservoir for surplus material remaining on the tip of a chimney when molded and removed from the molds. At the upper edge of this cavity is an annular V-shaped lip, $a$, projecting inwardly, which serves to contract the diameter thereof. It also forms an annular knife-edge or bead, the object of which is to so reduce the thickness of the glass at the point designated as to produce a determined line of fracture, and enable the closed tip $e$ of the chimney E to be easily and quickly removed by a blow, without injury or danger of breakage. The intermediate section B has extending through its center from end to end a conical passage, B′, the diameter of which varies according to the size and shape of chimneys to be manufactured. The lower terminus of this conical passage is somewhat greater in diameter than the top of the cavity A′, in order that the cut-off tip $e$ may readily pass through it when the mold is reversed to drop out the chimney. The top or ring mold C is bored to admit the plunger D to pass through it, and is counterbored from its base upward, as at C′, to admit of the proper formation of the lower or cylindrical part of the chimney between itself and the plunger. This ring-mold rests in a seat, $b$, of the section B, and at the junction of these two sections a half-bead groove is cut, as at $b'$, into the sections, in order to form a cavity for the reception of the glass necessary to make the strengthening-bead E′ upon the chimney.

The operation of my invention is as follows: The different sections constituting the mold having been placed in position, as described, and in a suitable press, the hot or molten glass is poured in at the opening $c$, and will pass down into the reservoir or cavity A′ in the base A. The plunger is then pressed downward and the glass forced up until the annular space between the plunger and the inner walls of the mold is completely filled. The plunger is then withdrawn, the top or ring mold lifted off, and the base A opened sufficiently to release the cut-off tip $e$, (which yet adheres to the chimney,) and the chimney itself is released from the section B by simply reversing the latter, thus permitting it to drop out. After breaking off the tip $e$ in the manner as already stated, the rough end of the chimney may be smoothed on the smoothing-stone, or fire-polished, whichever may seem most desirable or convenient.

It is readily seen that, by the use of my invention, as above described, a seamless pressed-glass chimney is made, of any desired shape and finish; that the grinding down of the seams, as required in a pressed-glass chimney of the ordinary make, is rendered unnecessary, and that the chimney formed in my improved mold is superior in appearance and point of finish to any of those manufactured in the old way. It may also be easily perceived that, in forming the opening in the top of the chimney, as described, there is less danger of breakage, and a more perfect symmetry and uniform thickness of the glass composing it secured. Besides these advantages, by the use of my improved molds a perfect pressed-glass lamp-chimney, superior in every respect to those manufactured by the old method, may be made more easily, perfectly, and with less expense and trouble.

Having thus described my invention, what I claim, and desire to secure by Letters Patent, is—

1. The mold for making seamless lamp-chimneys, composed of the bottom section A, halved and hinged together vertically, so as to open and close the intermediate section B and the top section C, the several sections being separated horizontally, so as to be lifted from off one another vertically, substantially as described.

2. The cut-off knife-edge or bead $a$ at the upper edge of the reservoir A' in the base-section A, constructed and arranged substantially as and for the purposes described.

3. Mold-base A, having the reservoir A', and supplied with the cut-off $a$, substantially as and for the purposes set forth.

4. As a new article of manufacture, a seamless pressed-glass lamp-chimney, substantially as described.

THOS. B. ATTERBURY.

Witnesses:
W. W. CLARK,
JAS. RATTYAN.